July 27, 1965 E. H. LAMBOURN 3,197,570

TELEPHONE SUBSCRIBER SETS USING AMPLIFIERS

Filed Sept. 18, 1961 3 Sheets-Sheet 1

INVENTOR
EDWARD HARRY LAMBOURN

BY [signature]

ATTORNEY

INVENTOR
EDWARD HARRY LAMBOURN

BY Phillip A. Weiss
ATTORNEY

INVENTOR
EDWARD HARRY LAMBOURN

BY [signature]
ATTORNEY

United States Patent Office 3,197,570

Patented July 27, 1965

3,197,570

TELEPHONE SUBSCRIBER SETS USING AMPLIFIERS

Edward Harry Lambourn, London, England, assignor to International Standard Electric Corporation, New York, N.Y., a corporation of Delaware Filed Sept. 18, 1961, Ser. No. 138,859
Claims priority, application Great Britain, Aug. 31, 1956, 26,730/56
12 Claims. (Cl. 179—81)

This invention relates in general to electric signalling systems and in particular, though not exclusively, to electric signalling systems suitable for use in connection with telephone sub-set instruments.

This application is a continuation in part of my prior application entitled "Amplifiers and Telephone Subscriber Instruments Using Amplifiers," Serial No. 680,232, filed August 26, 1957, now abandoned, the disclosure of which is deemed incorporated herein.

According to the invention, there is provided a telephone sub-set which includes a telephone comprising a transmitter and a receiver, a pair of line terminals, switch-hook contacts responsive to removal or replacement of the handset, an electro-acoustic transducer acting as a calling device, and a transistor amplifier usable in turn to amplify incoming ringing signals and outgoing speech signals generated in the transmitter, wherein the transistor in the amplifier is polarised negatively at its collector and the amplifier remains in a state of quiescence when it is subject only to standing current on the line, but is capable of responding to positive peaks of ringing current when received at the line terminals and transferred to the emitter of the transistor (by condenser action) whereby the emitter is positively pulsed to give amplifying action and produce an output calling signal in the said transducer so long as a ringing signal persists; and wherein when the switch-hook contacts operate in response to the lifting of the handset, the direct connection of the line terminals to the amplifier for incoming signals is rendered inoperative, and the transmitter is operatively connected to the amplifier for amplification of outgoing speech signals.

Embodiments according to the invention will now be described with reference to the accompanying drawings in which.

Figure 1:
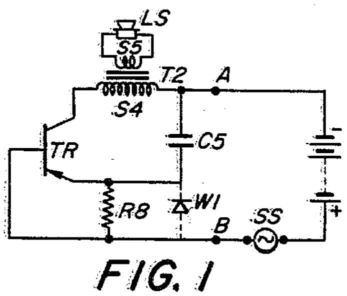
FIG. 1 shows a basic circuit for amplifying a calling signal received at a sub-set.
Figure 3A:
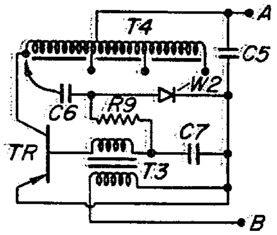

FIGS. 3*a*, *b*, *c* show three further basic amplifying circuits, improvements on FIG. 1.

Figure 4:
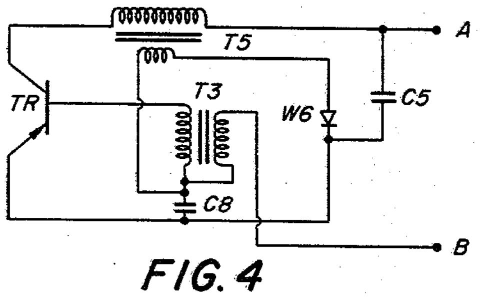

FIG. 4 shows yet a further basic amplifying circuit.

Figure 5:
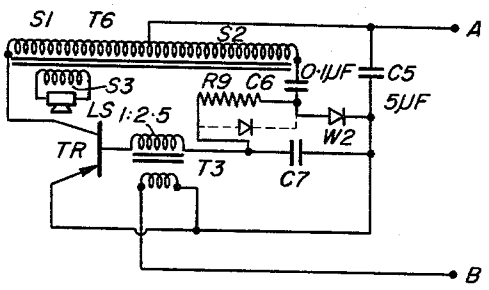

FIG. 5 shows further detail of a circuit according to FIG. 3.

Figure 6:
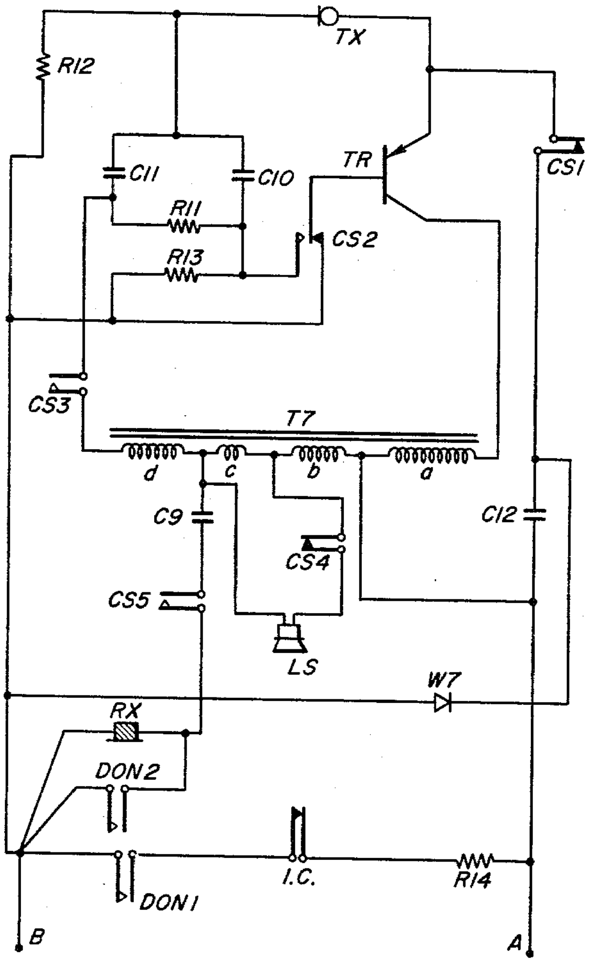

FIG. 6 shows a complete circuit for a telephone sub-set using an amplifier according to FIG. 1.

Figure 3B:
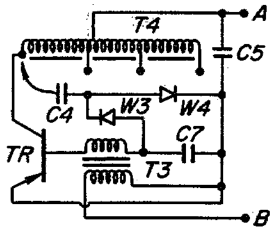
Figure 7:
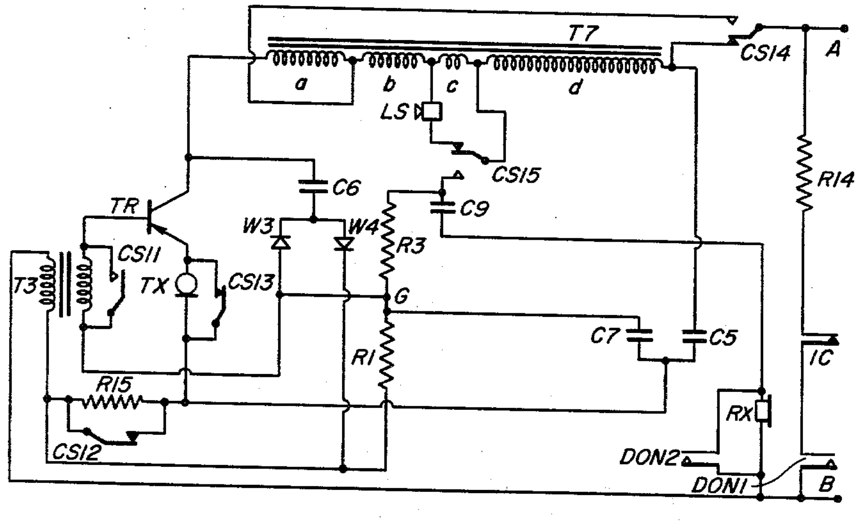

FIG. 7 shows a complete circuit for a telephone sub-set using an amplifier according to FIG. 3*b*.

Figure 8:
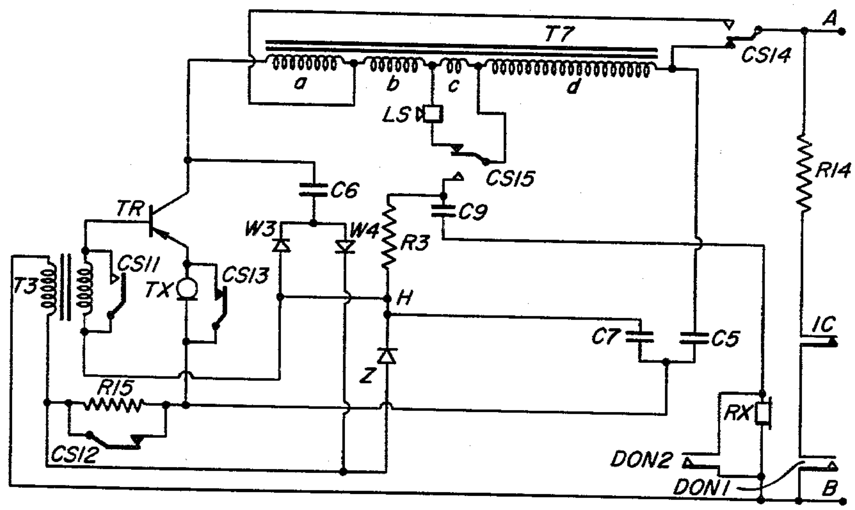

FIG. 8 shows the circuit of FIG. 7 adapted for use with a zener diode.

FIGS. 1 to 5, it will be understood, are the basic amplifying portions of more complete sub-sets according to the invention and illustrated in the subsequent figures.

FIG. 1 shows a circuit for amplifying a calling signal received at a sub-set. Terminals A, B are connected to a battery at an exchange which is in series with alternating current signal source SS for supplying calling tone. At the sub-set, terminal B is connected to the base of a transistor TR, and, through resistor R8 to the emitter thereof. Terminal A is connected to the collector of the transistor TR through winding S4 of transformer T4; and through capacitor C5 to resistor R8. A rectifier W1 may be connected in parallel with resistor R8.

Winding S5 of transformer T2 is connected in series with a loudspeaker LS. To summon the subscriber for an incoming call, the signal source SS is operated.

The operation of the circuit with the resistor R8 in this position is simple and exactly analogous to self-biassing a valve by grid circuit rectification of the drive. With ringing tone on the line, the capacitor C5 has a lower impedance to the ringing tone than the load represented by the transformer primary S4 and applies the tone voltage to the emitter of transistor TR. On positive half cycles of this voltage the emitter-base path of the transistor presents a low impedance; but on negative half cycles the transistor presents a high impedance, so that C5 can only discharge slowly through R8. The cumulative effect is to establish across R8 a negative voltage (with respect to the transistor base) of perhaps two thirds the peak value of the applied tone voltage, biassing transistor TR to its non-conductive state except on the peaks of the positive half cycles of the tone voltage, which drive the emitter positive to enable the transistor to conduct and pass output current to the load. The self-biassing voltage is thus periodically overcome by positive half cycles from the source SS.

A disadvantage of this arrangement is that perhaps two thirds of the drive voltage available at the sub-set is utilized only to nullify the self-bias voltage. This is avoided if R8 is replaced by the rectifier W1, which holds the emitter at base potential during negative half cycles of the drive but permits transistor amplification during positive half cycles. The transistor is not biassed off in this arrangement but is merely quiescent during negative half cycles. The full value of the drive voltage is effective at the transistor emitter.

In either mode of operation the transistor collector is thus held at an effectively fixed negative voltage to base, the emitter being positively pulsed to give amplifying action.

Figure 2:
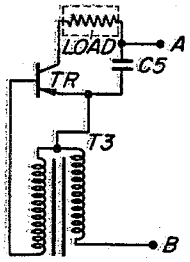
FIG. 2 shows a modification of FIG. 1.

To prevent loss of power in resistor R8 of FIG. 1, terminal B may be connected to the base and the emitter of the transistor TR through the windings of a matching input transformer T3, as shown in FIG. 2. In FIG. 2, transformer T2 and loudspeaker LS are represented diagrammatically by a load resistor. The sub-set responds to the operation of signal source SS as described in connection with FIG. 1, any residual charge on capacitor C5 leaking away harmlessly through one coil of transformer T3 during negative half cycles.

As described in connection with FIGS. 1 and 2, the transistor TR acts as a class B amplifier. Further power could be saved and sensitivity improved if the transistor could be biased to give class A amplification so that the transistor is conductive during both positive and negative half cycles of the calling tone. FIGS. 3, *a*, *b* and *c* and FIG. 4 together show four ways in which this may be done, using the output of the transistor amplifier as a source of enabling biassing potential.

In each of the figures making up FIG. 3, terminal B is shown connected through the primary winding of transformer T3 to the emitter of transistor TR, and through both windings of transformer T3 in series with capacitor C7 to the base of the transistor TR. The transistor collector is connected to the windings of an auto-transformer T4, whence a tapping is taken to terminal A. Terminal A is connected to the primary winding of transformer T3 by capacitor C5. At any convenient point along the windings of the transformer T4, a tapping is taken to a capacitor C6.

In FIG. 3*a*, capacitor C6 is connected to capacitor C5 by rectifier W2, and to capacitor C7 by limiting resistor R9. During the first positive half cycle of the calling signal, the capacitor C5 and the transistor TR function as already described, an output being delivered at the collector of the transistor. This output produces a charge on capacitor C6 which draws a balancing charge through resistor R9 from capacitor C7, thereby reducing the potential of the base of the transistor TR. During the succeeding negative half cycle, the positive charge on capacitor C6 is drained away through rectifier W2. The process then repeats itself. Resistor R9 serves to limit the extent to which capacitor C6 draws its charge from capacitor C7, and thereby determines the potential applied to the base of the transistor TR.

In FIG. 3*b*, a rectifier W3 replaces the resistor R9, and is poled oppositely to a rectifier W4. During successive half cycles of the calling signal the non-conductive resistance of the one rectifier serves to limit the charging effect of the other rectifier.

Figure 3C:
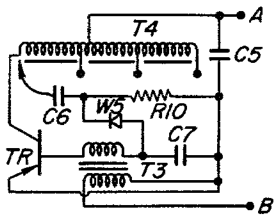

In FIG. 3*c*, a similar circuit to that of FIG. 3*a* is shown, but with the resistor and rectifier interchanged. Thus, rectifier W5 replaces resistor R9 an resistor R10 replaces rectifier W2 of FIG. 3*a*. Rectifier W5 is similarly poled with respect to capacitor C7, and resistor R10 still acts as a limiting resistor.

In all three cases, the bias applied to the base of the transistor TR may have any desired value, and may be arranged to give amplification of all or part only of the negative half cycle or the calling signal. If all the negative half cycle is amplified, the transistor acts as a class A amplifier.

Similar results may also be achieved by controlling the potential of the emitter of the transistor as shown in FIG. 4. Terminal B is connected through the primary winding of transformer T3, in series with capacitor C8, to the emitter of transistor TR; and through both windings of transformer T3 to the base of transistor TR. The collector of transistor TR is connected to terminal A through the primary winding of transformer T5. The secondary winding of transformer T5, in series with rectifier W6, is connected across capacitor C8. From a point in this circuit between the rectifier W6 and the capacitor C8, capacitor C5 is connected to terminal A. It will be seen that alternate half waves of the signal induced by the output from the collector are rectified in W6 and determine the charge in capacitor C8 and hence the potential of the emitter of the transistor TR.

FIG. 5 shows, in full line, a circuit according to FIG. 3*a* together with values of some of the components which have proved suitable in practice. If the arrangement of FIG. 3*b* is required, a rectifier is connected as shown by the dotted line, and the resistor R9 removed. A loudspeaker, LS, used to summon the subscriber for an incoming call, is included in FIG. 5.

In the complete sub-set circuit of FIG. 6, transistor TR is used both to amplify speech signals generated by the transmitter TX, as well as to amplify an incoming calling signal in the manner described in connection with FIG. 1. Cradle-switch contacts CS1–CS5 are shown in the position occupied when the telephone is resting on the cradle. Terminal B is connected through resistor R12 and transmitter TX to the emitter of transistor TR whence a lead is taken through contact CS1 and capacitor C12 to terminal A. Terminal B is also connected, through one pole of change-over contact CS2, to the base of the transistor TR. The other pole of change-over contact CS2 is connected to a balancing network consisting of two capacitors C10, C11 in parallel and a resistor R11 and thence to the transmitter TX. A resistor R13 is bridged across the poles of contact CS2. The collector of the transistor TR is connected to the windings *a, b, c, d* of auto-transformer T7 and contact CS3 to the balancing network between capacitor C11 and resistor R11. Between windings *a, b* of auto-transformer T7 a tapping it taken to terminal A. Contact CS4 in series with loudspeaker LS is connected across winding *c* of auto-transformer T7. Between windings *c, d* of auto-transformer T7 a lead is taken through capacitor C9, contact CS5 and receiver RX in shunt with dial off-normal contact DON2 to terminal B. Rectifier W7 is connected between terminal B and a point between contact CS1 and capacitor C12. Terminal B is connected to terminal A through dial off-normal contact DON1, dial interruption contact 1C and resistor R14.

When the telephone is resting on the cradle, the transistor is quiescent, carrying only standing current, and calling signal frequency applied at the exchange circulates in the base-emitter circuit of the transistor by way of contacts CS2, CS1 and capacitor C12 (equivalent to C5 in FIG. 1). Alternate half cycles of this incoming calling frequency produce signal pulses in the collector-emitter circuit of the transistor TR which includes contact CS1, capacitor C12 and winding *a* of auto-transformer T7, inducing in winding *c* a signal which operates the loudspeaker LS. When the subscriber answers, cradle-switch contacts CS1–CS5 are operated, breaking the circuits for the calling signal. The transistor is biased to the conductive condition by the potential applied to its base by way of resistor R13 and contact CS2 operated. Speech signals generated in the transmitter TX circulate in the base-emitter circuit of the transistor TR which includes contact CS2 operated and capacitor C10. Amplified signals circulate in the base-collector circuit of the transistor TR which includes the windings *a, b, c, d* of auto-transformer T7, contact CS3 operated, capacitors C11, C10 and contact CS2 operated. These in turn induce signals in the windings *b, c, d* which are passed direct to terminal A and, by means of contact CS3 operated, capacitor C11 and resistor R12 to terminal B.

In the sub-set circuit of FIG. 7, transistor TR is used both to amplify speech signals generated by the transmitter TX as well as to amplify an incoming calling signal in the manner described in connection with FIG. 3*b*. Cradle-switch contacts CS11–CS15 are shown in the position occupied when the telephone is resting on the cradle. A, B represent the terminals to which the loop from the exchange is connected. From terminal B, a lead is taken to the primary winding of transformer T3 and to resistor R15, in shunt with contact 12, whence one path leads by way of the transmitter TX, in shunt with contact CS13, the emitter and collector of transistor TR, the windings *a, b, c, d* in series of the transformer T7 and change-over contact CS14 to terminal A. Another path from resistor R15 leads by way of capacitor C5 and contact CS14 to terminal A. From the primary winding of transformer T3, a lead is taken to a potential divider formed by resistors R1, R3 to change-over contact CS15. Contact CS15 is also connected to terminal B by way of capacitor C9 and receiver RX in shunt with dial off-normal contact DON2. From a point G between the resistors R1, R3 a lead is taken through the secondary winding of transformer T3, in shunt with contact CS11, to the base of transistor TR. Capacitor C7 is connected between point G and a point between capacitor C5 and resistor R15. Between windings *a, b* of transformer T7 a tapping is led to contact CS14. Winding *c* of transformer T7 is connected in series with contact CS15 and a calling loudspeaker LS used to summon the subscriber for an incoming call. The collector of transistor TR is connected to capacitor C6 and thence to a pair of oppositely-poled rectifiers W3, W4, of which one, W3, is connected to point G, and the other, W4, to the primary winding of transformer T3. Terminal B is connected to terminal A by a circuit including dial off-normal contact DON1, dial interruption contact IC, and resistor R14.

To summon the subscriber for an incoming call, an alternating current calling signal is applied to the loop at the exchange. This circulates from terminal B by way of the primary winding of transformer T3, contact CS12, capacitor C5 and contact CS14 to terminal A. By means of the secondary winding of transformer T3, a signal is induced in the base-emitter circuit of transistor TR which includes contact CS13 and capacitor C7. In the manner described in connection with FIG. 6*b*, an amplified signal is produced in the base-collector circuit of transistor TR which includes the windings *a, b, c, d*, in series, of transformer T7, capacitors C5, C7 and the secondary winding of transformer T3. The capacitors C5, C6, C7 correspond respectively to capacitors C5, C6, C7 of FIG. 3*b*. By means of winding *c* of transformer T7, a signal is passed over contact CS15 to the calling loudspeaker LS which becomes energised.

When the telephone is lifted to answer the call, cradle-switch contacts CS11–CS15 are operated, breaking the circuits by which the calling signal is supplied, short-circuiting the secondary winding of transformer T3 and bringing the transmitter TX and the receiver RX into circuit. The loop is completed between terminal B and terminal A by the circuit including the primary winding of transformer T3, potential divider R1, R3, contact CS15 operated, windings *b*, *c* of transformer T7 and contact CS14 operated. The potential of the point G is applied to the base of the transistor TR which is thereby made conductive, rendering both unnecessary and ineffective the biassing circuit including capacitor C6 and rectifiers W3, W4. Direct current flows from terminal B to terminal A through the transmitter TX by way of the primary winding of transformer T3, resistor R15, transmitter TX, the emitter and collector of transistor TR, winding *a* of transformer T7 and contact CS14 operated. Speech signals generated in the transmitter TX circulate in the base-emitter circuit of transistor TR which includes capacitor C7 and contact CS11 operated. Amplified signals are generated in the base-collector circuit of transistor TR which includes windings *a*, *b*, *c*, *d*, in series, of transformer T7, capacitors C5, C7 and contact CS 11 operated. Induced signals are passed to line over the circuit including contact CS14 operated, windings *b*, *c*, *d* in series acting as the secondary of transformer T7, capacitor C5, resistor R15 and the primary winding of transformer T3. Incoming speech signals are received over the circuit formed by contact CS14 operated, windings *b*, *c*, of transformer T7, contact CS15 operated, capacitor C9 and the receiver RX.

FIG. 8 shows a circuit diagram for a sub-set which uses a zener diode in conjunction with a transistor to obtain a loop current which, when the sub-set is in use, is independent of the loop resistance. In electronic telephone exchanges, it is desirable, in order to be able to identify a calling line, that each line should consume the same current when in the calling condition. This requirement has hitherto necessitated the provision of an individual adjustment for each line. By using a zener diode in the manner to be described, the need for such individual adjustments is eliminated. Further, since the zener diode is included in the sub-set circuit, the switching of the diode into and out of service may be placed under the control of the subscriber. This consideration can be applied to advantage in the provision of dialling facilities. The zener diode also acts as a stabiliser against the effects of temperature on the transistor with which it is associated.

For the sake of direct comparison, the circuit of FIG. 7 has been taken as a basis for the circuit of FIG. 8. The only difference between the two circuits is that a zener diode Z in FIG. 8 replaces the resistor R1 of FIG. 7, and that the diode Z is connected to the resistor R3 at the point H. For the diode Z to work satisfactorily in conjunction with the transistor TR, it is not necessary that the transistor should be provided with the biassing network including the capacitors C6, C7 and the rectifiers W3, W4.

Terminal B is connected through resistor R15 (FIG. 8) to the emitter of the transistor TR. Terminal B is also connected through the zener diode Z to the base of the transistor TR. Terminal A is connected through the windings of the transformer T7 (FIG. 8) direct to the collector of the transistor TR, and through resistor R3 to the base of the transistor TR. When the sub-set is in use, therefore, there are two parallel paths between terminals B and A, namely the emitter-collector circuit of the transistor TR, and the zener diode Z in series with resistor R3.

The sub-set components are given values such that, when the sub-set is in use, the voltage across the zener diode Z causes the diode to conduct. It is a property of a zener diode that, when the diode is in the conducting condition the potential across the diode remains constant, despite changes in the current. Therefore, the potential differences between terminal B and the point H (FIG. 8) is constant when the sub-set is in use. This potential difference is equal to the sum of the potential across the base and the emitter of the transistor TR, and the potential drop across the resistor R7 (FIG. 8). Since the former is constant, the latter must also be constant. Hence the current flowing through the resistor R7 (FIG. 8) to the emitter of the transistor TR is also constant.

The potential across terminals B and A will depend on the loop resistance, for example the resistance of the line connecting the terminals to the exchange battery. If the potential across the terminals B, A is increased or decreased with reference to a given value, there is a corresponding increase or decrease in the potential across resistor R3, since the drop across the diode Z is constant. The current flowing through the diode Z in series with the resistor R3 is correspondingly increased or decreased, while the current flowing in the emitter circuit remains constant. The change of potential across resistor R3 is accompanied by a change of potential between the base and the collector of the transistor TR. It is a property of a transistor that the current flowing in the collector circuit is not affected by this change.

The current which flows through the zener diode Z and the series resistance R3 provides the biassing potential for the base of the transistor TR. This current therefore need not be large, and the sub-set components are so proportioned that nearly all the current flowing between terminals B and A when the sub-set is in use flows in the emitter-collector circuit of the transistor TR. Since, however, this current is maintained at a constant value, it follows that the current flowing in the subscribers' loop is also substantially constant and independent of the loop resistance.

If changes of ambient temperature alter the conductivity of the transistor TR, these are offset by a corresponding change of potential across the resistor R3.

The dialling circuit shown in FIGS. 6, 7, 8 is suitable for use with an electronic exchange. Dialling pulses consist of pulses of changed potential instead of the break and make pulses of conventional systems. The pulses are produced by connecting resistors R14 intermittently across terminals A, B. As will be seen from FIG. 8, the zener diode Z has no control over the current flowing in the loop during a dialling pulse.

While the principles of the invention have been described above in connection with specific embodiments, and particular modifications thereof, it is to be clearly understood that this description is made only by way of example and not as a limitation on the scope of the invention.

What is claimed:

1. A transistorized telephone subset for establishing and receiving telephone calls over a telephone line connected thereto, comprising a transmitter and a receiver for transmitting and receiving speech signals over said line when a telephone call is in progress, a loudspeaker for receiving ringing signals from said line when said line is being called and for producing audible tones in accordance therewith, amplifying means normally connected between said line and said loudspeaker, self biasing means in said amplifying means operated responsive to output signals from said amplifying means for causing said amplifying means to operate as a class A amplifier in amplifying said ringing signals, and hook switch control means operated responsive to the removal of said subset for disconnecting said self biasing means and for connecting the said amplifying means to amplify the said transmitted speech signals.

2. In a transistorized sub-set as set forth in claim 1, a Zener diode, and means for connecting said diode in circuit with said line to stabilize the operation of said amplifying means and to render the amplifying characteristics of said amplifying means independent of the resistance of said line.

3. A transistorized sub-set as set forth in claim 1 wherein said amplifying means includes a transistor having a base-emitter circuit and a base-collector circuit and wherein the said transmitter is included in the said base-emitter circuit and the said loudspeaker is included in the said base-collector circuit.

4. A transistorized sub-set as set forth in claim 3 wherein the said ringing signals comprise alternating current signals and wherein the said self biasing means includes a first capacitor in the said base-collector circuit and a second capacitor in the said base-emitter circuit, means for applying the half cycles of said ringing signals to said first capacitor, to charge said first capacitor and means including a unidrectional element interconnecting said capacitors so that the said charge on the first capacitor is transferred to said second capacitor on alternate half-cycles.

5. A transistorized sub-set as set forth in claim 4 wherein a resistor is included in circuit with said second capacitor to limit the value of the charge transferred to the second capacitor.

6. A telephone sub-set including a handset comprising a transmitter and a receiver, a pair of line terminals, hook-switch contacts operated responsive to removal or replacement of said handset, an electro-acoustic transducer acting as a calling device, transistor amplifier means for amplifying incoming ringing signals and outgoing speech signals generated in said transmitter, said transistor comprising a base, emitter, and collector, means responsive to quiescent line current for self biasing said transistor to negatively polarize said collector, means for biasing said transistor to respond to positive peaks of ringing current, capacitor means for transferring current received at the said line terminals to the emitter of the transistor whereby the emitter is positively pulsed to amplify said current and to produce an output calling signal in said transducer, means including said hook-switch contacts operated in response to the removal of said handset for disconnecting said transistor amplifier from said capacitor, and means also including said hook-switch contacts operated responsive to the removal of said handset for connecting said transmitter directly to said amplifier for amplification of out-going speech signals.

7. A telephone sub-set as claimed in claim 6 comprising a first capacitor charging responsive to the transistor output, a second capacitor and at least one asymmetrical conductor connected to the first capacitor and so arranged that a charge is developed in the second capacitor in response to a charge or charges of one polarity in the first capacitor; and means for applying to the transistor the potential developed by the charge in the second capacitor, whereby the amplifying function of the transistor is controlled.

8. A telephone sub-set as claimed in claim 7 comprising a resistor connected so as to limit the charge developed in the second capacitor.

9. A telephone sub-set as claimed in claim 8 and in which the said resistor is the resistance of an asymmetrical conductor connected in the direction of low conductivity.

10. A telephone sub-set as claimed in claim 6 comprising a transformer having its primary winding in the transistor output circuit, an asymmetrical conductor means connected to the secondary winding of said transformer, a capacitor in series with said asymmetrical conductor means; and feedback means for applying to the transistor the potential developed by a charge in the capacitor in response to the transistor output.

11. A telephone sub-set as claimed in claim 6, wherein said transistor amplifier includes a zener diode and a resistor, means for connecting said zener diode and said resistor in series between the said line terminals, means for connecting the emitter of said transistor to one of said line terminals and for connecting the collector of said transistor to the other terminal, means for connecting the base of said transistor to a point between said zener diode and said resistor; whereby, when the sub-set is in use a substantially constant potential is developed across the zener diode and applied to the base of the transistor causing a substantially constant current to flow in the emitter circuit of the transistor.

12. A telephone sub-set as claimed in claim 11 and means for causing a large portion of the current in the subscriber's loop to flow through the emitter circuit of the transistor.

References Cited by the Examiner

UNITED STATES PATENTS

| | | | |
|---|---|---|---|
| 2,385,265 | 9/45 | Foley et al. | 179—81 |
| 2,824,175 | 2/58 | Meacham et al. | 179—84 |
| 2,842,623 | 7/58 | Lehr | 179—81 |
| 2,894,075 | 7/59 | Kunckel | 179—81 |
| 2,976,369 | 3/61 | Salzer | 179—81 |

FOREIGN PATENTS

| | | |
|---|---|---|
| 865,012 | 4/61 | Great Britain. |

ROBERT H. ROSE, *Primary Examiner.*

WALTER L. LYNDE, *Examiner.*